United States Patent
Habassi et al.

(10) Patent No.: US 9,481,602 B2
(45) Date of Patent: Nov. 1, 2016

(54) METHOD FOR PREPARING THE SURFACE OF A LENS INCLUDING AN ANTI-SOILING COATING FOR EDGING THE SAME

(75) Inventors: Chefik Habassi, Charenton le Pont (FR); Marcel Yaigre, Charenton le Pont (FR)

(73) Assignee: Essilor International, Charenton le Pont (FR)

( * ) Notice: Subject to any disclaimer, the term of this patent is extended or adjusted under 35 U.S.C. 154(b) by 1699 days.

(21) Appl. No.: 12/678,255

(22) PCT Filed: Sep. 12, 2008

(86) PCT No.: PCT/FR2008/051640
§ 371 (c)(1),
(2), (4) Date: Mar. 15, 2010

(87) PCT Pub. No.: WO2009/047426
PCT Pub. Date: Apr. 16, 2009

(65) Prior Publication Data
US 2010/0200541 A1    Aug. 12, 2010

(30) Foreign Application Priority Data
Sep. 14, 2007 (FR) ..................................... 07 57557

(51) Int. Cl.
| | | |
|---|---|---|
| *B05D 5/06* | (2006.01) | |
| *C03C 17/30* | (2006.01) | |
| *B24B 9/14* | (2006.01) | |
| *C03C 15/00* | (2006.01) | |
| *C03C 17/34* | (2006.01) | |
| *C03C 19/00* | (2006.01) | |
| *C03C 23/00* | (2006.01) | |

(52) U.S. Cl.
CPC ................. *C03C 17/30* (2013.01); *B24B 9/14* (2013.01); *C03C 15/00* (2013.01); *C03C 17/3405* (2013.01); *C03C 19/00* (2013.01); *C03C 23/0005* (2013.01); *C03C 2217/75* (2013.01); *C03C 2217/76* (2013.01); *C03C 2218/355* (2013.01)

(58) Field of Classification Search
CPC ... C03C 17/30; C03C 17/3405; C03C 15/00; C03C 19/00; C03C 23/0005; C03C 2217/75; C03C 2217/76; C03C 2218/355; B24B 9/14
USPC .................................................... 427/160–169
See application file for complete search history.

(56) References Cited

U.S. PATENT DOCUMENTS

| | | | | |
|---|---|---|---|---|
| 6,250,512 | B1 * | 6/2001 | Salamon | 222/402.1 |
| 2002/0008847 | A1 * | 1/2002 | Ayoub | 351/174 |
| 2007/0090092 | A1 | 4/2007 | Forstner et al. | 216/67 |

FOREIGN PATENT DOCUMENTS

| | | | |
|---|---|---|---|
| EP | 1 167 312 | 1/2002 | |
| EP | 1 392 613 | 3/2004 | |
| EP | 1 633 684 | 3/2006 | |
| FR | 2 845 636 | 4/2004 | |
| FR | 2 847 346 | 5/2004 | |
| FR | 2847346 A1 * | 5/2004 | ............... G02B 1/12 |
| JP | 2004-122238 | 4/2004 | |
| WO | WO 03/057641 | 7/2003 | |
| WO | WO 2005/015270 | 2/2005 | |

OTHER PUBLICATIONS

Machine translation of FR 2847346 specification.*

* cited by examiner

*Primary Examiner* — Michael Wieczorek
*Assistant Examiner* — Michael G Miller
(74) *Attorney, Agent, or Firm* — Norton Rose Fulbright US LLP

(57) ABSTRACT

The invention relates to a method for treating an optical lens coated onto at least one of the main surfaces thereof with an outer hydrophobic and/or oleophobic coating, and for making it capable of undergoing an edging process, comprising a step of treating the peripheral area of said coated main surface which results in the removal of the hydrophobic and/or oleophobic coating and/or in the modification of said coating that lowers the hydrophobic character thereof, and a step of depositing a temporary polymeric coating onto said main surface of the lens so as to cover at least partially the hydrophobic and/or oleophobic coating and the peripheral area treated during the previous step, in order to provide an optical lens having onto at least one of the main surfaces thereof an outer hydrophobic and/or oleophobic coating and, in direct contact with said hydrophobic and/or oleophobic coating, a temporary polymeric coating adhering to the surface of the coated lens. The invention also relates to an edging method and to a lens capable of undergoing an edging process.

21 Claims, No Drawings

METHOD FOR PREPARING THE SURFACE OF A LENS INCLUDING AN ANTI-SOILING COATING FOR EDGING THE SAME

This application is a national phase application under 35 U.S.C. §371 of International Application No. PCT/FR2008/051640 filed 12 Sep. 2008, which claims priority to French Application No. 0757557 filed 14 Sep. 2007. The entire text of each of the above-referenced disclosures is specifically incorporated herein by reference without disclaimer.

The present invention generally speaking relates to the optics glass field, in particular for lenses, and more particularly for ophthalmic lenses, provided with an outer coating with hydrophobic and/or oleophobic properties (anti-soiling top coat) coated with a temporary coating for facilitating the edging of the glass.

An optical lens, especially an ophthalmic lens, is the result of a series of successive molding and/or surface processing and/or polishing operations which determine the geometry of both convex and concave optical surfaces of the lens, and thereafter of suitable surface treatments.

The last finish step for making an ophthalmic lens is the step of edging or trimming, which consists in machining the edge or the periphery of the lens to conform the same to the required dimensions for adapting to the eyeglass frame within which it is intended to be mounted.

The edging is typically effected on a grinder comprising diamond wheels which perform the machining such as defined hereabove. The lens is clamped, during this operation, through axially acting blocking elements. The relative movement of the glass relative to the wheel is controlled, typically through a numerical control, so as to give the lens the required shape. As it appears, the lens must absolutely be immobilized during such movement.

To do this, prior to edging, a blocking of the lens has to be performed, that is to say a clamping device or a chuck is provided to hold the convex surface of the lens. Typically, a holding pad, such as a sticker, for example a double-sided adhesive pad, is arranged between the chuck and the convex surface of the lens. The chuck to which the lens adheres through the adhesive pad is then mechanically fixed along the mounting axis of the grinder and an axial arm is blocking the lens by applying a central force on the lens side opposite to the chuck. Upon machining, a tangential torque is exerted onto the lens, which may cause the lens to rotate relative to the chuck if the lens clamping device is not efficient enough. The reliable positioning of the lens mostly depends on the good adhesion at the holding pad/convex surface of the lens interface.

Ophthalmic lenses of the last generation comprise most of the time an organic or a mineral outer coating which changes the surface energy, for example anti-soiling hydrophobic and/or oleophobic coatings, well known in the art. They are for most of them materials of the fluorosilane type, which reduce the surface energy so as to prevent greasy soil deposits from adhering, which can then be more easily removed.

This type of surface coating may be efficient to such an extent that the adhesion at the pad/convex surface interface may get damaged, which makes difficult to conduct satisfying edging operations, in particular for polycarbonate lenses (noted PC, for example bisphenol-A polycarbonate) which edging generates much higher stresses as compared to other materials.

Upon edging, the lens should not undergo any offset of more than 2°, preferably of maximum 1°, and therefore the pad adhesion to the lens surface is crucial for obtaining a good edging. As a result, an unsuitably conducted edging operation, the lens would be simply irreparably damaged and lost.

To overcome these difficulties in edging lenses that are provided with an outer hydrophobic and/or oleophobic coating, it has been proposed to form on such coatings a temporary coating, of organic or mineral nature, in particular a $MgF_2$ coating. For example, the European patent applications EP 1 392 613 and EP 1 633 684, assigned to ESSILOR, describe the use of such a temporary coating, which increases the surface energy and thus enables the optician to perform a reliable edging of the lens. After edging, the temporary coating should be removed so as to restore the lens outer hydrophobic and/or oleophobic coating surface properties.

Depositing strippable protective films of polymeric nature onto anti-soiling coatings has been described especially in the patent applications WO 2005/015270, WO 03/057641 and JP 2004-122238. They respectively disclose as coatings directly contacting the anti-soiling coating, temporary films based on chlorinated polyolefin resin or on polyethylene terephthalate, polytetrafluoroethylene or poly(vinyl acetate). These protective coatings prevent the lens from slipping out during the edging operation.

However, the more hydrophobic the glass surface, the more difficult it is for a coating to adhere thereto. Such problem is all the more acute that the thickness of the temporary coating is high, especially with thicknesses ranging from about 5 to 10 nm. A temporary film that has been in particular deposited by dip coating does hardly adhere to the glass surface, more particularly to a concave face, and thus will end up peeling off. An anti-soiling coating such as OPTOOL DSX®, marketed by the Daikin Industries company, causes for example serious spreading difficulties of the protective coating composition, as well as a poor adhesion of the corresponding coating. These problems get even worse when the protective coating composition is an aqueous composition, in particular a latex.

The present invention was conceived to provide a global solution to those problems, whatever the type of lens substrate used and whatever the lens geometry, that is to say independently from the power thereof.

It is therefore a first object of the present invention to provide a method enabling to deposit a temporary coating onto a lens comprising a hydrophobic and/or oleophobic surface coating without being faced with adhesion problems between both coatings. In other words, it is a method for making a lens with hydrophobic and/or oleophobic surface properties capable of undergoing an edging process.

It is a further object of the present invention to provide an edging method directed to lenses coated with a hydrophobic and/or oleophobic surface coating, which would allow a very high edging success rate while avoiding any slipping problem of the lens during the edging operation of interest.

After the edging, the removal of the temporary layer should enable to recover a hydrophobic and/or oleophobic outer coating with properties that are substantially the same as the initial properties and in particular a water static contact angle that is substantially similar to the initial water static contact angle.

It is a further object of the present invention to provide a lens, having hydrophobic and/or oleophobic surface properties, capable of undergoing an edging process.

These objects are aimed at according to the present invention through a treating method involving modifying part of the hydrophobic and/or oleophobic surface onto which the temporary coating should be deposited, so as to promote a physical adhesion with the protective coating.

The method for treating an optical lens of the invention, especially for rendering said optical lens capable of undergoing an edging process, comprises the steps of:
- providing an optical lens coated on at least one of the main surfaces thereof with a hydrophobic and/or oleophobic outer coating;
- submitting at least part of the peripheral area of said coated main surface to a treatment resulting in the removal of the hydrophobic and/or oleophobic coating and/or in the modification of said coating that lowers the hydrophobic character thereof, in at least part of this peripheral area;
- depositing a temporary coating of polymeric nature onto said main surface of the lens so as to cover at least partially the hydrophobic and/or oleophobic coating and the peripheral area treated during the previous step;
- recovering the optical lens comprising onto at least one of the main surfaces thereof a hydrophobic and/or oleophobic outer coating and, in direct contact with said hydrophobic and/or oleophobic coating, a temporary polymeric coating adhering to the surface of the coated lens.

In the present application, when a lens comprises one or more coating(s) on the surface thereof, the expression "to deposit a layer or a coating onto the lens" means that a layer or a coating is to be deposited onto the uncovered surface (exposed) of the lens outer coating, that is to say the coating that is the furthest from the lens substrate.

A coating which is "on" a substrate or which has been deposited "onto" a substrate is defined as being a coating which (i) is arranged above the substrate, (ii) is not necessarily in contact with the substrate, which means that one or more intermediate coating(s) may be inserted between the substrate and the coating of interest, and (iii) does not necessarily completely cover up said substrate.

In the present application, a "polymer" includes homopolymers, copolymers and oligomers.

The optical lens used in the present invention comprises a substrate, preferably transparent, made of organic or mineral glass, having a convex main face and a concave main face, at least one of said main faces being including an anti-soiling coating (hydrophobic and/or oleophobic coating). As used herein, a "lens" also means a lens blank. This lens is preferably an ophthalmic lens for eyeglasses. The lens may be a polarized lens, a photochromic lens, or a tinted anti-sun lens.

The method according to the invention is generally carried out on the convex face of the lens, but it can also be carried out on its concave face or on both main faces of a lens, each coated with an anti-soiling coating.

Amongst the thermoplastic materials to be suitably used for the substrates, are to be mentioned (meth)acrylic (co) polymers, in particular methyl poly(methacrylate) (PMMA), thio(meth)acrylic (co)polymers, polyvinyl butyral (PVB), polycarbonates (PC), polyurethanes (PU), poly(thiourethanes), polyol allylcarbonate (co)polymers, ethylene/vinyl acetate thermoplastic copolymers, polyesters such as poly (ethylene terephthalate) (PET) or poly(butylene terephthalate) (PBT), polyepisulfides, polyepoxides, copolymers of polycarbonates and polyesters, cycloolefinic copolymers such as copolymers of ethylene and norbornene or ethylene and cyclopentadiene, and combinations thereof.

As used herein, a "(co)polymer" is intended to mean a copolymer or a polymer. A (meth)acrylate is intended to mean an acrylate or a methacrylate.

The preferred substrates for use in the invention include those substrates obtained by polymerizing alkyl methacrylates, in particular $C_1$-$C_4$ alkyl methacrylates such as methyl (meth)acrylate and ethyl(meth)acrylate, polyethoxylated aromatic (meth)acrylates such as the polyethoxylated bisphenol di(meth)acrylates, allyl derivatives such as linear or branched, aliphatic or aromatic polyol allyl carbonates, thio(meth)acrylates, episulfides, as well as polythiol/polyisocyanate precursor mixtures (to produce polythiourethanes).

As used herein, a polycarbonate (PC) is intended to mean both the homopolycarbonates and the copolycarbonates and block copolycarbonates.

Particularly recommended substrates are those substrates obtained by (co)polymerizing diethylene glycol bis allyl carbonate, sold, for example, under the trade name CR-39® by the PPG Industries company (ORMA® lenses from ESSILOR), or by polymerizing thio(meth)acrylic monomers, such as those described in the French patent application FR 2734827. The substrates may be obtained by polymerizing mixtures from the hereabove monomers or they may also comprise mixtures from these polymers and (co)polymers.

Hydrophobic and/or oleophobic coatings are well known in the art and are typically deposited onto an antireflective coating, although they also may be deposited, for example, directly onto abrasion-resistant and/or scratch-resistant coatings.

They are defined as coatings which deionized water static contact angle is higher than or equal to 75°, preferably higher than or equal to 90°, and more preferably higher than or equal to 100°. The static contact angle may be determined by means of the liquid drop model, according to which a liquid drop having a diameter of less than 2 mm is carefully deposited onto a solid, non absorbent surface and the angle at the interface between the liquid and the solid surface is measured.

Preferred hydrophobic and/or oleophobic coatings have a low surface energy, that is to say they reduce the lens surface energy to less than 20 mJ/m$^2$, preferably to less than 14 mJ/m$^2$, more preferably to less than 13 mJ/m$^2$ and even more preferably to less than 12 mJ/m$^2$. The surface energy values are calculated according to the OWENS-WENDT method described in "Estimation of a surface force energy of polymers" OWENS D. K., WENDT R. G. (1969) J. Appl. Polym. Sci, 13, 1741-1747.

Typically, their thickness is lower than or equal to 10 nm, preferably does range from 1 to 10 nm, more preferably from 1 to 5 nm, and even more preferably from 2 to 3 nm.

The hydrophobic and/or oleophobic coatings of the invention are preferably organic in nature. As used herein, a "layer having an organic nature" is intended to mean a layer comprising at least 40%, more preferably at least 50% of organic materials relative to the layer total weight.

Preferred hydrophobic and/or oleophobic surface coatings comprise at least one fluorinated compound, more preferably at least one silane, silazane or polysilazane type compound carrying one or more fluorinated groups, in particular fluorinated hydrocarbon groups, perfluorocarbon groups, fluorinated polyether groups, such as $F_3C$—$(OC_3F_6)_{24}$—$O$—$(CF_2)_2$—$(CH_2)_2$—$O$—$CH_2$—$Si(OCH_3)_3$ or perfluoropolyether group.

A usual method to form a hydrophobic and/or oleophobic coating consists in depositing compounds carrying fluorinated groups and Si—R groups, wherein R represents a hydroxyl group or a precursor group such as a hydrolyzable group, for example Cl, $NH_2$, NH— or —O-alkyl, preferably an alkoxy group. They are preferably derived from fluorosilane- or fluorosilazane-type precursors, carrying preferably at least two hydrolyzable groups per molecule. Such compounds once deposited onto a surface are capable of undergoing polymerization and/or cross-linking reactions, directly or after hydrolysis.

Fluorosilanes to be particularly suitably used to form hydrophobic and/or oleophobic coatings are those containing fluoropolyether groups described in the U.S. Pat. No. 6,277,485.

Those fluorosilanes have the general formula:

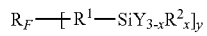

wherein $R_F$ is a monovalent or divalent polyfluoropolyether group; $R^1$ is a divalent alkylene group, arylene group, or combinations thereof, optionally containing one or more heteroatoms or functional groups and optionally substituted with halide atoms, and preferably containing 2 to 16 carbon atoms; $R^2$ is a lower alkyl group (i.e., a $C_1$-$C_4$ alkyl group); Y is a halide atom, a lower alkoxy group (i.e., a $C_1$-$C_4$ alkoxy group, preferably, a methoxy or ethoxy group), or a lower acyloxy group (i.e., —OC(O)$R^3$ wherein $R^3$ is a $C_1$-$C_4$ alkyl group); x is 0 or 1; and y is 1 ($R_F$ is monovalent) or 2 ($R_F$ is divalent). Suitable compounds typically have a number average molecular weight of at least 1000.

Preferably, Y is a lower alkoxy group and $R_F$ is a perfluoropolyether group. Other recommended fluorosilanes have the formula:

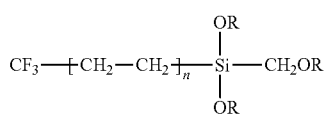

wherein n=5, 7, 9 or 11 and R is an alkyl group, preferably a $C_1$-$C_{10}$ alkyl group such as —$CH_3$, —$C_2H_5$ and —$C_3H_7$; $CF_3(CF_2)_5CH_2CH_2Si(OC_2H_5)_3$ ((tridecafluoro-1,1,2,2-tetrahydro)octyl-triethoxysilane);

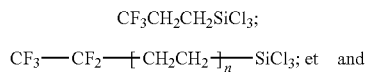

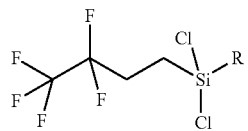

wherein n=7 or 9 and R is such as defined hereabove.

Fluorosilane-containing compositions also recommended for preparing hydrophobic and/or oleophobic coatings are described in the U.S. Pat. No. 6,183,872. They comprise organic group-containing fluoropolymers carrying silicon-based groups having the following general formula and a molecular weight of from $5.10^2$ to $10^5$:

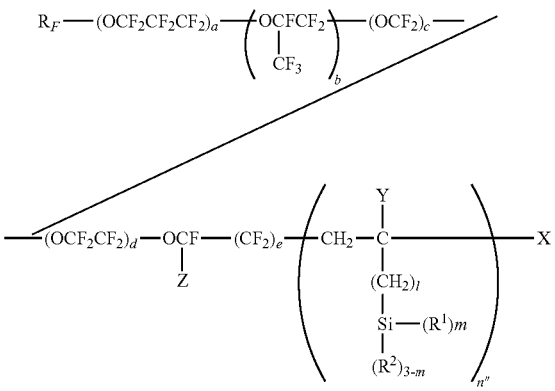

wherein $R_F$ represents a perfluoroalkyl group; Z represents a fluoro or a trifluoromethyl group; a, b, c, d and e each represent, independently from each other, 0 or an integer higher than or equal to 1, provided however that the sum of a+b+c+d+e is not less than 1 and that the order of the repeating units in brackets under a, b, c, d and e is not limited to the one illustrated; Y represents H or an alkyl group having from 1 to 4 carbon atoms; X represents a hydrogen, a bromine or an iodine atom; $R^1$ represents a hydroxyl group or a hydrolyzable group; $R^2$ represents a hydrogen atom or a monovalent hydrocarbon group, l is 0, 1 or 2; m is 1, 2 or 3; and n" is an integer being at least equal to 1, preferably at least equal to 2.

Other compounds to be suitably used for preparing anti-soiling coatings are described in the patents JP 2005-187936 and EP 1300433, and have the following formula:

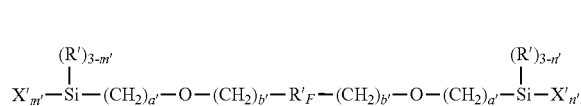

wherein $R'_F$ is a linear chain, perfluoropolyether divalent radical, R' is a $C_1$-$C_4$ alkyl radical or a phenyl radical, X' is a hydrolyzable group, a' is an integer ranging from 0 to 2, b' is an integer ranging from 1 to 5, and m' and n' are integers equal to 2 or 3.

Commercial compositions to be suitably used for preparing hydrophobic and/or oleophobic coatings are the KY130® (having the formula as given in the patent JP 2005-187936) and KP 801 M® compositions marketed by the Shin-Etsu Chemical company and the OPTOOL DSX® composition (a fluorinated resin comprising perfluoropropylene groups having the formula as given in the U.S. Pat. No. 6,183,872) marketed by the Daikin Industries company. OPTOOL DSX® is the most preferred anti-soiling coating composition.

Solvents for use in the anti-soiling coating compositions are fluorinated solvents and alkanols such as methanol, preferably fluorinated solvents. Examples of fluorinated solvents are organic molecules that are in whole or part fluorinated and have a carbon chain comprising from 1 to 25 carbon atoms, such as fluorinated alkanes, preferably perfluorinated alkanes, and fluorinated ether oxides, preferably perfluoroalkyl alkyl ether oxides, and their mixtures. To be mentioned is perfluorohexane or nonafluoro-isobutyl ether.

There is a plurality of various methods for depositing anti-soiling coating compositions, amongst which the liquid phase deposition such as dip coating, spin coating (centrifugation), spray coating, or the vapor phase deposition such as vacuum evaporation. Deposition by spin or dip coating is the most preferred method.

Preparing the anti-soiling coating surface represents the key step in the method of the invention to a completely successful deposition onto this surface.

Such preparation consists in submitting at least part of the peripheral area of the coated main surface to a processing resulting in the removal of the hydrophobic and/or oleophobic coating and/or in the modification of said coating that lowers the hydrophobic character thereof, in at least part of this peripheral area.

As used herein, a "peripheral area or region of the lens surface" does mean the area that is the farthest from the center of the lens, and which generally has an annular configuration.

Optionally, at least part of the lens edge, when this edge is covered at least partially with a hydrophobic and/or oleophobic coating, may in addition be submitted to a treatment resulting in the removal of the hydrophobic and/or oleophobic coating and/or in the modification of said coating that lowers the hydrophobic character thereof, in at least part of said edge. This treatment may be the same as that of the main surface, or may be different. It can indeed happen that the lens edge is incidentally coated with a hydrophobic and/or oleophobic coating, especially when this one has been deposited onto the main surface of said lens by dip coating. Treatments for the lens main surface periphery that are described in the present application may also be applied to the edge of the lens.

The preferred treatments for locally removing the hydrophobic and/or oleophobic coating, and thus to promote a local bonding, are mechanical treatments, preferably abrasive treatments. Their action comprises modifying the surface with which the protective coating will be in contact, by making the surface more hydrophilic.

An abrasive treatment may be performed by means of an abrasive fabric or an abrasive sheet or cloth, or by any other means of the same nature. Any abrasive powder bonded to a plane (paper, cloth, cloth-lined paper, plastic) or a cylindrical support, which can be adapted to lathes, may be suitably used in the present invention. Examples of usable natural or synthetic abrasive powders include aluminous powders such as corundum and emery; siliceous materials such as glass, sand, talc, some quartz-containing sandstones, quartz itself; pumice, garnet, flint, metal carbides, silicon carbide. An abrasive sheet may also be used, or an abrasive roll, an abrasive tape or a synthetic abrasive pad of the Scotch-Brite® type, that are marketed by 3M. An emery cloth will be preferably used, a sandpaper, a corundum paper, a steel wool or a synthetic abrasive pad.

The abrasive treatment may be performed by hand or be automated. In one embodiment of the invention, the operation of abrading the periphery of the lens and, if necessary, the edge thereof is automated and uses a machine or a tool provided with a surface onto which an abrasive powder has been bonded, for example a motorized lathe to which an abrasive cylinder (grinder) has been fastened to a rotating rod. In one embodiment of the invention, the abrasive machine or tool is fixed and the lens is placed in the vicinity of the tool or machine and rotated around its axis so as to abrade its periphery and optionally its edge.

After the lens periphery abrading operation, which generally also results in locally breaking up the sharp edges of the glass, it is preferred to perform a manual or an automated wiping of the surface, so as to remove therefrom the dust that has been generated, and/or a compressed air blowing. Wiping is preferably performed using a soft fabric provided with a fluffily surface, for example a fabric having undergone a suede skin finish treatment. As a rule, the processed glass is blown, wiped, then blown again.

In addition to such mechanical treatments, provided that the nature of the anti-soiling coating makes it possible— which may be easily determined by the skilled person, chemical or physico-chemical treatments may be used to remove and/or to modify the anti-soiling coating that lowers the hydrophobic character thereof. These treatments may be associated with a mechanical action and in some events are intended to prepare the mechanical action.

Any surface preparation to reduce the surface tension and thus promote the adhesion of the temporary coating without affecting the final anti-soiling coating performances (outside the peripheral area) may be suitably employed in the present invention.

Examples of suitable treatments include bombardment using energetic species, for example an ion beam or an electron beam, a corona discharge treatment, an ion spallation treatment, an ultraviolet treatment, a plasma processing or a laser beam treatment. It may also be an acid or a base surface processing and/or a solvent surface processing. Many treatments may be combined.

By energetic species, it is meant species with an energy ranging from 1 to 150 eV, preferably from 10 to 150 eV, and more preferably from 40 to 150 eV. Energetic species may be chemical species such as ions, radicals, or species such as photons or electrons.

Such treatments can convert the hydrophobic and/or oleophobic material to a novel state by causing cleavages, creating new molecular bonds or polar groups on the surface, reactive entity recombinations, deletions, locally resulting in the creation of a new material with different surface properties. For example, using oxygen plasma makes it possible to generate hydroxyl groups, thus increasing the wettability of the surface to be coated. These treatments may also increase locally the surface roughness and promote the adhesion of the protective coating.

Preferably, the treatment of the invention increases the treated surface energy of the lens up to a value of at least 15 $mJ/m^2$, preferably up to a value of at least 25 $mJ/m^2$. Typically the surface energy of the processed surface does range from 15 to 70 $mJ/m^2$, preferably from 25 to 70 $mJ/m^2$.

The hydrophobic and/or oleophobic coating treatments using liquids, through acids or bases, do actually perform a corrosion abrasion of the surface. Non limiting treatments that may be used are treatments through oxalic acid, diluted hydrochloric acid, diluted soda or potash.

The treatments of the invention generally reduce the static contact angle with deionized water of the processed surface to a value of less than 85°, preferably of less than 75°, more preferably of less than 60° and even more preferably of less than 50°.

As a matter of course, the surface of the lens with hydrophobic and/or oleophobic properties which is not intended to undergo any treatment of the invention may be protected so as to limit said treatment to the area of interest.

It may be envisaged as a protective means to use a mask or any other suitable technique, to be placed onto the surface of the lens to be treated or optionally to be inserted between the source and the surface to be treated, whenever an energetic species-based treatment is employed. It is usual in optics to use masks and such a technique is amongst others described in the U.S. Pat. No. 5,792,537.

The treatment may apply uniformly to the peripheral area of the main surface (and optionally the edge), which means that the processed area has a continuous surface, but the whole processed areas may also have a discontinuous surface, by limiting for example the treatment to the areas of interest by means of a mask. Preferably, the treatment of the invention is carried out uniformly onto a crown-shaped peripheral area. In another embodiment, the treatment of the invention is performed, optionally uniformly, to the half of the main surface peripheral area. If this area is uniformly treated, it then presents the form of a half crown.

The treated area should have a surface sufficient to promote the adhesion of the temporary coating to be deposited. However, it has been observed that even a small surface could be sufficient to promote the bonding of the temporary coating, which makes the method of the invention particularly attractive.

Preferably, the treatment is carried out onto at least part of an area extending from the edge of the lens up to a distance from the edge of the lens representing less than 2% of the radius of the lens, more preferably less than 1.5%, even more preferably less than 1%, and most preferably less than 0.5%, and preferably on the whole surface of such area.

The percentage of the surface of the lens face that is submitted to the treatment of the invention is typically of less than 5%, preferably is of less than 3%, more preferably is of less than 2% and even more preferably is of less than 1%. For example, with a 65 mm-diameter lens, the processing will be typically performed onto a peripheral crown having a width of 0.1 to 0.2 mm, which represents less than 2% of the main face surface area.

As previously mentioned, the temporary coating of the invention is directly deposited onto the hydrophobic and/or oleophobic outer coating that has been processed during the previous step of the method.

The protective polymeric temporary coating is preferably organic in nature. It may be a monolayered or a multilayered coating, in particular a bilayered coating. II may be made of any polymeric material that is capable of increasing the surface energy of the lens with hydrophobic and/or oleophobic properties and that may be removed in a subsequent step after the edging step.

Preferably, the temporary coating enables to increase the surface energy of the lens up to at least 15 mJ/m$^2$, preferably up to at least 25 mJ/m$^2$. Typically the surface energy of the temporary coating ranges from 15 to 70 mJ/m$^2$, preferably from 25 to 70 mJ/m$^2$.

Naturally, the material of the temporary coating should be such that it does not definitively damage the surface properties of the hydrophobic and/or oleophobic coating and that after the removal thereof, the optical and surface properties of the lens are globally the same as compared to those of the lens prior to depositing the protective temporary coating.

The polymer(s) of the temporary coating may be selected from vinyl polymers, halogenated polymers, in particular halogenated polyolefins, especially chlorinated and/or fluorinated polymers, in particular chlorinated and/or fluorinated polyolefins, polyurethanes, polyurethane-ureas, polyepoxides, polyepisulfides, polyesters, polyethers, polyesterethers, polythio(meth)acrylates, poly(meth)acrylates, alkyd resins, polyalkylene terephtalates (for example polyethylene terephtalate), cellulose polymers and their combinations. Some of these materials are described in European patent application EP 1 392 613 and the world application WO 2005/015270.

Chlorinated polyolefins include chlorinated polyethylene and chlorinated polypropylene. Fluorinated polyolefins include chlorotrifluoroethylene, hexafluoropropene, 1-hydropentafluoropropene, 2-hydropentafluoropropene, perfluoroalkylvinylether (for example perfluoromethylvinylether), trifluoroethylene, tetrafluoroethylene and vinylidene fluoride homo- and copolymers.

To be mentioned as vinyl polymers are vinyl poly(acetate), polypropylene, polyethylene, styrene type polymers, poly(vinylphenol), polyvinylpyrrolidone) and poly(vinylpyrrolidone-co-vinyl acetate). Poly(vinyl acetate) is the most preferred vinyl polymer.

Coatings derived from polyurethane type latex or poly (meth)acrylic type latex dried compositions are particularly interesting. Polyurethane type latex-based compositions are preferred.

As is well known, a latex is a dispersion in an aqueous medium of polymer or copolymer particles. The aqueous medium may be water, for example distilled water or deionized water, or even a mixture of water and one or more solvents, especially of water and alkanol, typically a C1 to C6 alkanol, and preferably ethanol.

Suitable examples of polyurethane type latexes include polyurethane latexes comprising polyester groups, preferably aliphatic polyester groups. Preferably, polyurethane units are obtained by polymerizing at least one aliphatic polyisocyanate and at least one aliphatic polyol. Such polyurethane-polyester latexes are commercially available from the ZENECA RESINS company under the trade name Neorez® (for example, Neorez® R-962, Neorez® R-972, Neorez® R-986, Neorez® R-9603) or from BAXENDEN CHEMICALS, a subsidiary of WITCO Corporation, under the trade name Witcobond® (for example, Witcobond® 232, Witcobond® 234, Witcobond® 240, Witcobond® 242).

Suitable examples of poly(meth)acrylic type latexes include latexes of copolymers derived from (meth)acrylate monomers such as for example ethyl, butyl, methoxyethyl or ethoxyethyl(meth)acrylate, with a generally minor amount of at least one other co-monomer, such as for example styrene.

Preferred poly(meth)acrylic type latexes are latexes of acrylate-styrene copolymers. Such latexes of acrylate-styrene copolymers are commercially available from the ZENECA RESINS company under the trade name NEOCRYL®, or from the B.F. Goodrich Chemical Co. under the trade name CARBOSET®.

Preferably the temporary coating is a strippable coating. Its thickness may vary within relatively large amounts, ranging for example from 1 to 150 micrometers, preferably from 10 to 40 µm, more preferably from 15 to 30 µm and even more preferably from 15 to 20 µm. It may be deposited through any suitable traditional liquid method such as dip coating, spin coating, spraying, or be deposited by means of a brush, preferably through dip coating or spin coating.

Preferably, the temporary coating is formed by first depositing onto said main surface of the lens a liquid coating composition, and then curing the liquid composition.

The temporary coating should be deposited onto the main surface of the lens coated with the hydrophobic and/or oleophobic coating treated during the previous step so as to cover at least partially the peripheral area that has been treated and the hydrophobic and/or oleophobic coating.

The deposition may be performed onto the whole surface of the lens face intended to receive the adhesive holding pad or onto a part thereof. In particular, the temporary coating will be able to cover the central part of the lens but should not be only applied onto the area intended to receive the contact of the lens holding pad. At least part of the peripheral area of the surface of the lens treated so as to remove the hydrophobic and/or oleophobic coating or to modify the same to decrease the hydrophobic character thereof has to be coated with the protective coating, so as to enable a sufficient adhesion of the temporary coating. This peripheral area has indeed been treated in order to facilitate the adhesion of the lens to the protective coating.

The deposition may uniformly cover the corresponding area, in which case it has a continuous structure, but it may also have a discontinuous structure (intermittent deposition), for example in the form of a screen. Depositions with discontinuous structures may be obtained through pad printing.

The area covered with the protective coating is such that the contact area between the protective coating and the holding pad is sufficient for ensuring the adhesion of the lens to the pad. Generally, the temporary protective coating covers at least 15%, preferably at least 20%, more preferably at least 30%, even more preferably at least 40%, and most preferably the whole of the surface of the lens face onto which the pad adheres, that is to say typically the convex face of the lens.

Preferably, and very especially when the temporary coating has been deposited onto all the surface of one of the lens faces, this coating has some degree of transparency enabling to conduct on the lens the usual power measurements by means of a frontofocometer. Therefore, the lens coated with the temporary coating of the invention preferably has a transmission of at least 18%, preferably at least 40%, as measured in accordance with the standard ISO 8980/3.

Once the outer protective temporary coating has been deposited, the lens becomes capable of undergoing an edging process.

The method for treating an optical lens according to the present invention may further comprise a subsequent step of blocking the lens provided with the temporary coating in direct contact with the hydrophobic and/or oleophobic coating, that is to say a step for arranging said lens in an edging device comprising a holding pad, which adheres to the temporary coating, an edging step of the blocked lens, and a deblocking step consisting in removing the lens from the edging device. These additional steps are traditional and known to the person skilled in the art, and therefore they will not be described in detail. The treating method of the present invention is in this case an optical lens edging method.

However, it should be specified that the holding pads that are preferably used for blocking are stickers that are self-adhesive on both faces, for example 3M adhesives.

After edging, the glass will have the required dimensions to be suitably inserted into the corresponding eyeglass frame. More precisely, the edging method according to the present invention provides glasses with a maximum 2° offset, and, most preferably an offset that is lower than or equal to 1°.

In a subsequent step, the protective temporary coating may be removed from the edged lens, so as to restore the hydrophobic and/or oleophobic surface properties thereof. This protective coating, depending upon its nature, may be mechanically degraded for example by being dry wiped, removed within a suitable liquid medium, or simply by being stripped out when strippable, or by successively implementing several of these techniques. These removal steps have already been described in the prior art and thus will not be further detailed.

At the end of the step of removal of the protective temporary coating, a final edged optical lens is recovered, which has optical and surface characteristics of the same order or that are substantially the same as those of the initial lens, especially as regards the hydrophobic and/or oleophobic surface properties thereof.

Advantageously, the method according to the invention significantly improves the edging success rate for lenses coated with a hydrophobic and/or oleophobic coating, as compared with a method wherein such a lens is simply coated with a protective coating, without any surface preparation. The success rate of an edging method according to the present invention is of about 100%, and enables thus to avoid the hazards originating from the quality of an edged glass.

The present invention further relates to an optical lens capable of undergoing an edging process, that may be obtained through the method of the invention, comprising on at least one of the main surfaces thereof a hydrophobic and/or oleophobic outer coating, at least one part of the peripheral area of said main coated surface having been submitted to a treatment resulting in the removal of the hydrophobic and/or oleophobic coating and/or in the modification of said coating that lowers the hydrophobic character thereof, in at least part of this peripheral area, and, deposited directly onto said hydrophobic and/or oleophobic outer coating, a temporary coating of polymeric nature, said temporary coating at least partially covering the hydrophobic and/or oleophobic coating and the peripheral area submitted to said treatment, thus adhering to the surface of the lens.

The present invention is illustrated, in a non limitative way, by means of the following examples.

EXAMPLES 1 TO 10 AND COMPARATIVE EXAMPLES 1 TO 5

15 ORMA® ophthalmic lenses from Essilor were processed as follows:

After having deposited an anti-abrasion coating through dip coating and a multilayered antireflection coating based on alternating $ZrO_2$ and $SiO_2$ layers through evaporation, a hydrophobic and/or oleophobic layer was deposited, still through evaporation, within a Satis 1200 DL vacuum chamber.

The conditions under which the hydrophobic and/or oleophobic layer was deposited are the following:

Programmed thickness=14 nm, Pressure=$1\times10^{-3}$ Pa (induced pressure)
Deposition time=1 to 2 minutes
Joule effect amount=13 to 15%
Programmed deposition rate=0.4 nm/s
Temperature=40° C. (not controlled)
The actual thickness of the deposited layer varies from 2 to 5 nm.

Once the processed lenses were recovered, 15 lenses were dip-coated with a temporary coating composition based on polyurethane latex PROXR 910® provided by the SYNTRON company.

Out of these 15 lenses, 5 lenses had received no treatment prior to depositing the temporary layer, 5 had undergone an abrasive surface treatment, at the annular periphery of the lens by means of a emery cloth abrasive paper (Norton R222 type) with a 180 fine grit, and 5 lenses had been abraded in the same way as with an emery cloth, but with a Scotch Brite fabric from the 3M company.

For the 5 lenses which had not been submitted to any previous abrasive treatment, it could be observed that for three of them, it was impossible to form an adhesive polyurethane latex layer after withdrawal of the lenses from the latex bath (i.e. a failure rate of 60%).

However, for the 10 lenses which had been submitted to a surface processing in accordance with the present invention, a film was obtained, formed along the whole surface of the lens, which, upon drying, did adhere and allow the edging of the lenses with no offset.

After edging, the film was peeled off by hand.

EXAMPLES 11 TO 20

The previous tests were repeated by depositing Optool DSX® thicker layers (programmed thickness: 20 nm), under the same deposition conditions as hereabove. The Optool DSX® layer thicknesses actually obtained were of about 5 to 10 nm.

The same lenses were made as in the previous examples (except the thickness of the hydrophobic and/or oleophobic layer).

The same results were obtained as previously, that is to say a failure rate of 60% for the glasses which had not been abraded beforehand and a success rate of 100% for the abraded glasses, which means that a film covering the whole glass surface is formed from the very first dip coating, and that the temporary layer obtained makes it possible to successfully perform the edging operation.

It can thus be observed that the present invention provides a beneficial result, even if the thickness of the hydrophobic and/or oleophobic layer is greater.

Other examples performed on polycarbonate substrates (more difficult to edge) obtained the same results.

Offset Measuring Procedure for Lenses Submitted to an Edging Operation

I—Test Description

The edging test was performed on an Essilor Kappa grinder.

Lenses were edged so as to provide the same with a frame template specific shape (see hereunder).

The following equipment was required for the test to be performed:

Essilor CLE 60 frontofocometer (for glass pointing and final inspection).

Essilor Kappa digital equipment (tracer-blocker-grinder).

Frame template of the Charmant type reference 8320, model 05, size 51.

Pseudo frame for control.

Adhesive dot or holding adhesive pad LEAP II, 24 mm diameter, GAM200 from the 3M company.

Essilor clamping device (chuck) for receiving the adhesive pad.

II—Sampling and the Mounting Parameters

The retained mounting dimensions were as follows:

Height: Half-height boxing i.e.

PD (right and left)=32 mm and axis=90°

The trimming cycle used was a cycle adapted to the material (plastic cycle for low refractive index, polycarbonate cycle for PC and cycle for substrates having a mean refractive index MHO. The retained clamping pressure was the brittle glass pressure option of the grinder.

III—Controls

After edging, controls were performed so as to determine whether the edging operation succeeded. Controls were performed using the frontofocometer CLE 60 by pointing the lenses held in the pseudo-frame. Axes were registered during this phase.

If the lens, after the edging operation could not be inserted into the pseudo-frame or if the lens could be inserted into the pseudo-frame, but with an offset of more than 2°, the lens was considered as non-compliant and did not pass the test successfully. If the glass offset was lower than 2°, the lens did pass the test successfully.

The invention claimed is:

1. A method for treating an optical lens, comprising the following steps:
   providing an optical lens coated on at least one of the main surfaces thereof with a hydrophobic and/or oleophobic outer coating;
   depositing a temporary coating of polymeric nature comprising one or more layers onto the main surface of the lens so as to cover at least partially the hydrophobic and/or oleophobic coating, wherein a layer of the temporary coating is in direct contact with said hydrophobic and/or oleophobic coating and is formed by depositing onto said main surface of the lens a liquid coating composition, and then curing the liquid composition; and
   wherein, prior to the step of depositing the temporary coating onto the main surface of the lens, at least part of the peripheral area of the main surface coated with the hydrophobic and/or oleophobic coating is submitted to a treatment resulting in the removal of the coating in at least part of this peripheral area, and/or to the modification of the coating that lowers the hydrophobic character thereof, in at least part of this peripheral area, without affecting the hydrophobic and/or oleophobic coating on the main surface outside said peripheral area.

2. The method of claim 1, wherein the treatment is a mechanical treatment.

3. The method of claim 2, wherein the treatment is an abrasive treatment.

4. The method of claim 3, wherein the abrasive treatment comprises using an abrasive fabric, sheet, or cloth or a synthetic abrasive pad.

5. The method of claim 1, wherein the treatment is a chemical or a physico-chemical treatment.

6. The method of claim 5, wherein the treatment comprises bombardment with an ion beam or an electron beam treatment, a corona discharge treatment, an ion spallation treatment, an ultraviolet treatment, a plasma treatment, a laser beam treatment, an acid or a base surface treatment, a solvent treatment, or a combination of these treatments.

7. The method of claim 1, wherein the lens edge is covered at least partially with a hydrophobic and/or oleophobic coating, and at least part of the lens edge is submitted to a treatment resulting in the removal of the hydrophobic and/or oleophobic coating and/or in the modification of the coating that lowers the hydrophobic character thereof, in at least part of the edge.

8. The method of claim 1, wherein the treatment lowers the static contact angle with deionized water of the treated surface to a value of less than 85°.

9. The method of claim 1, wherein the treatment is carried out on at least part of an area extending from the edge of the lens up to a distance from the edge of the lens representing less than 2% of the radius of the lens.

10. The method of claim 1, wherein the percentage of the surface of the lens face that is submitted to the treatment is of less than 5%.

11. The method of claim 1, wherein the hydrophobic and/or oleophobic coating thickness is equal to or lower than 10 nm.

12. The method of claim 1, wherein the temporary coating comprises at least one polymer further defined as a vinyl polymer, halogenated polymer, polyurethane, polyurethane-urea, polyepoxide, polyepisulfide, polyester, polyether, polyester-ether, polythio(meth)acrylate, poly(meth)acrylate, alkyd resin, polyalkylene terephtalate or cellulose polymer.

13. The method of claim 1, wherein the temporary coating is a strippable coating.

14. The method of claim 1, wherein the temporary coating has a thickness ranging from 1 to 150 μm.

15. The method of claim 1, wherein the temporary coating is formed by depositing onto the main surface of the lens a liquid coating composition, and then curing the liquid composition.

16. The method of claim 1, wherein the temporary coating is deposited by dip-coating or spin-coating.

17. The method of claim 16, wherein the temporary coating is deposited by dip-coating.

18. The method of claim 1, which further comprises the steps of:
   placing the lens in an edging device comprising a holding pad so that the holding pad adheres to the temporary coating;
   edging the lens;
   withdrawing the lens from the edging device; and
   removing the temporary coating so as to recover a final edged optical lens.

19. The method of claim 1, wherein the liquid coating composition is a latex.

20. The method of claim 1, wherein the treated area has a surface such that adhesion of the temporary coating to the main surface of the lens is sufficiently promoted to allow edging of the optical lens.

21. The method of claim 1, wherein the temporary coating is deposited onto the main surface of the lens so as to cover the central part of said main surface of the lens and to further cover at least partially the treated peripheral area.

* * * * *